(12) United States Patent
Nakamura

(10) Patent No.: US 9,560,680 B2
(45) Date of Patent: Jan. 31, 2017

(54) TWO TERMINAL WIRELESS COMMUNICATION SYSTEM

(75) Inventor: Hiroyuki Nakamura, Kawasaki (JP)

(73) Assignee: CLARION CO., LTD., Saitama (JP)

(*) Notice: Subject to any disclaimer, the term of this patent is extended or adjusted under 35 U.S.C. 154(b) by 22 days.

(21) Appl. No.: 14/391,107

(22) PCT Filed: Apr. 10, 2012

(86) PCT No.: PCT/JP2012/059772
§ 371 (c)(1),
(2), (4) Date: Oct. 7, 2014

(87) PCT Pub. No.: WO2013/153617
PCT Pub. Date: Oct. 17, 2013

(65) Prior Publication Data
US 2015/0078283 A1    Mar. 19, 2015

(51) Int. Cl.
*H04W 76/02* (2009.01)
*H04W 12/06* (2009.01)
(Continued)

(52) U.S. Cl.
CPC ........ *H04W 76/021* (2013.01); *H04L 63/0853* (2013.01); *H04L 63/0876* (2013.01);
(Continued)

(58) Field of Classification Search
None
See application file for complete search history.

(56) References Cited

U.S. PATENT DOCUMENTS 8,619,623 B2   12/2013   Chhabra
8,732,315 B2   5/2014    Chhabra et al.
(Continued)

FOREIGN PATENT DOCUMENTS

JP    2006-261850    9/2006
JP    2008-252773    10/2008
(Continued)

OTHER PUBLICATIONS

International Search Report issued in PCT/JP2012/059772, Jun. 19, 2012.
(Continued)

*Primary Examiner* — Brian Roberts
(74) *Attorney, Agent, or Firm* — McCarter & English, LLP

(57) ABSTRACT

In the present invention, a first terminal device is provided with an address request means that makes a request to a second terminal device for a unique address allocated to the second terminal device that belongs to a prescribed network segment. The second terminal device is provided with an address notification means that notifies the first terminal device of the unique address requested by the address request means. Also, the first terminal device is provided with a first unique ID generation means that generates a first unique ID on the basis of the unique address notified by the second terminal device. Also, the second terminal device is provided with a second unique ID generation means that generates a second unique ID on the basis of the own unique address of the second unique ID generation means. The first terminal device and the second terminal device establish a mutual wireless communication connection in a case where the first unique ID and the second unique ID match.

21 Claims, 3 Drawing Sheets

(51) Int. Cl.
  *H04L 29/06* (2006.01)
  *H04W 8/26* (2009.01)
  *H04W 12/08* (2009.01)
(52) U.S. Cl.
  CPC .............. *H04W 8/26* (2013.01); *H04W 12/06* (2013.01); *H04W 12/08* (2013.01)

(56) References Cited

U.S. PATENT DOCUMENTS

| | | | |
|---|---|---|---|
| 2008/0237352 A1 | 10/2008 | Uchida | |
| 2008/0253302 A1 | 10/2008 | Nago | |
| 2011/0185200 A1* | 7/2011 | Sim | G06F 1/3203 713/310 |
| 2011/0274098 A1* | 11/2011 | Jung | H04W 76/023 370/338 |
| 2011/0275316 A1* | 11/2011 | Suumaki | G06K 7/10237 455/41.1 |
| 2012/0051244 A1* | 3/2012 | Nagara | H04W 8/005 370/252 |
| 2014/0112197 A1 | 4/2014 | Chhabra | |
| 2014/0258550 A1 | 9/2014 | Chhabra et al. | |

FOREIGN PATENT DOCUMENTS

| | | |
|---|---|---|
| JP | 2008-270927 | 11/2008 |
| JP | 2010-500817 | 1/2010 |
| JP | 2010-507282 | 3/2010 |
| JP | 2010-251895 | 11/2010 |
| JP | 2011-055116 | 3/2011 |

OTHER PUBLICATIONS

International Preliminary Report on Patentability issued in Application No. PCT/JP2012/059772 on Oct. 14, 2014.
International Preliminary Report on Patentability issued in Application No. PCT/JP2012/059772 on Oct. 23, 2014.
Japanese Office Action issued in Japanese Application No. 2014-509932 on Apr. 5, 2016.

* cited by examiner

TWO TERMINAL WIRELESS COMMUNICATION SYSTEM

TECHNICAL FIELD

This application is a National Phase of Application No.: PCT/JP2012/059772, filed Apr. 10, 2012. The present invention is related to a wireless communication system having first and second terminal devices which are capable of wireless communication directly without intervention by an access point. Further, the present invention is related to terminal devices constituting the wireless communication system.

BACKGROUND ART

A back monitoring system with a monitor installed in a tractor and a camera installed in a trailer, so that a rearview image behind the trailer captured by the camera is displayed on the monitor in the tractor, is known. In the back monitoring system of this type, if the monitor and the camera are in wired connection with each other, when the trailer is coupled to or decoupled from the tractor, complicated work for physically connecting or disconnecting the wiring cables needs to be done. Therefore, it is preferable that the back monitoring system is configured such that the monitor and the camera are wirelessly connectable to communicate.

Infrastructure mode may be considered as a mode to be employed for connecting two terminal devices (the monitor and the camera) to communicate wirelessly. In infrastructure mode, a terminal device may communicate wirelessly with another terminal device through a predetermined access point. However, when wireless communication connection is established in the back monitoring system in infrastructure mode, it is necessary that a list of IP (Internet Protocol) addresses allocated to each one of all cameras having been shipped is managed and updated by necessity on the monitor side. Moreover, in infrastructure mode, it is necessary that the wireless communication connection is established through an access point; therefore, while the access point intervenes in the communication, displaying the rearview image on a screen of the monitor may be lagged. In these reasons, it is considered to be preferable that a monitor and a camera in a back monitoring system are connected in ad-hoc mode so that they communicate each other directly.

In ad-hoc mode, the terminal devices are enabled to wirelessly communicate each other directly without intervention by an access point. In ad-hoc mode, by eliminating the access point, easy establishment of an ad-hoc network is provided. Meanwhile, however, in ad-hoc mode in general, in compensation for the easy establishment of the ad-hoc network, defects may be found in, for example, a lower security level in device authentication.

As a wireless communication technique to cover this type of defect, a technique to apply WPS (Wi-Fi Protected Setup), which is prescribed for infrastructure mode, to ad-hoc mode is disclosed in, for example, patent document 1 (Japanese translation of PCT international application No. 2010-500817A), patent document 2 (Japanese translation of PCT international application No. 2010-507282A), and patent document 3 (Japanese Patent Provisional Publication No. 2010-251895A). Moreover, recently, Wi-Fi Direct (registered trademark) which introduces a device authorization process in ad-hoc mode has been suggested and practically used.

However, applying ad-hoc mode in these manners to the wireless communication system for the back monitoring system may not always be preferable. For example, in Wi-Fi Direct (registered trademark), similarly to conventional ad-hoc mode, terminal devices are allowed to wirelessly communicate with each other without intervention by an access point. However, in practical use, the terminal devices enabled for Wi-Fi-Direct (registered trademark) are equipped with an access point function so that one of the P2P-connected terminal devices serves as an access point. Therefore, in the case of Wi-Fi Direct (registered trademark), it is necessary to activate the access point function prior to performing the device authentication process, and it may take time to establish the connection. Thus, the inventor provides a wireless communication system, in which connection in ad-hoc mode between terminal devices can be established easily and securely, and a terminal device constituting the wireless communication system.

SUMMARY OF THE INVENTION

A wireless communication system according to an embodiment of the present invention includes a first terminal device and a second terminal device which are capable of communicating wirelessly. The first terminal device includes an address requesting means for requesting the second terminal device for a unique address allocated to the second terminal device belonging to a predetermined network segment. The second terminal device includes an address notifying means for notifying the first terminal device of the unique address requested by the address requesting means. Further, the first terminal device includes a first unique ID generating means for generating a first unique ID based on the unique address notified of by the second terminal device. further, the second terminal device includes a second unique ID generating means for generating a second unique ID based on the unique address. The first terminal device and the second terminal device establish mutual wireless communication connection when the first unique ID and the second unique ID match each other.

The unique address may be, for example, a MAC address of the second terminal device.

The first terminal device may include a first storage means for storing a first authorization ID, and a search means for searching a terminal device having an authorization ID to match with the first authorization ID within a network segment defined based on the first authorization ID. Further, the second terminal device may include a second storage means for storing a second authorization ID, and a distributing means for distributing the second authorization ID. In this case, when search by the search means succeeds by the distributed second authorization ID and the first authorization ID matching each other, the address requesting means requests for the unique address within the network segment defined based on the first authorization ID.

The first and the second authorization IDs may be, for example, a common authorization ID being stored in advance in the first and the second storage means.

The search means may execute the search during a first period with a first unique ID, which was generated previously by the first unique ID generating means, as the first authorization ID, and if no terminal device having an authorization ID matching with the first unique ID is found during the first period, may execute the search after switching the first authorization ID from the first unique ID to the common authorization ID. Further, the distributing means may distribute the second unique ID, which was generated previously by the second unique ID generating means, as the second authorization ID during a second period, and may distribute the second authorization ID switched from the second unique ID to the common authorization ID when there is no response to the second unique ID during the second period.

The first terminal device may include a first operation button, and the search means may execute the search when the first operation button is pressed.

The second terminal device may include a second operation button, and the distributing means may distribute the second authorization ID when the second operation button is pressed.

The first terminal device may include a selecting means configured to allow a user to select, when a plurality of terminal devices are found by the search means, one of the plurality of terminal devices.

Further, a terminal device according to an embodiment of the present invention is capable of wirelessly communicating with an external terminal device, and includes an address requesting means for requesting an external terminal device belonging to a predetermined network segment for a unique address allocated to the external terminal device, and a unique ID generating means for generating a unique ID based on the unique address of the external terminal device notified of in response to the request from the address requesting means. Wireless communication connection is established with the external terminal device when the unique ID generated by the unique ID generating means and the unique ID generated by the external terminal device based on the unique address match each other. The unique address may be, for example, a MAC address of the external terminal device.

Further, the terminal device may include a storage means for storing a predetermined authorization ID, and a search means for searching an external terminal device having an authorization ID to match with the authorization ID within a network segment defined based on the authorization ID. When the external terminal device is found by the search means, the address requesting means may request for the unique address within the network segment defined based on the authorization ID stored in the storing means. The authorization ID may be, for example, a common authorization ID being provided to the terminal device and the external terminal device in advance.

The search means may execute the search during a predetermined period with a unique ID, which was generated previously by the unique ID generating means, as the authorization ID, and if no external terminal device having an authorization ID matching with the unique ID is found during the predetermined period, may execute the search after switching the authorization ID from the unique ID to the common authorization ID.

Further, the terminal device may include a predetermined operation button, and the search means may execute the search when the operation button is pressed.

Further, the terminal device may include a selecting means configured to allow a user to select, when a plurality of external terminal devices are found by the search means, one of the plurality of external terminal devices.

Further, a terminal device according to an embodiment of the present invention is capable of wirelessly communicating with an external terminal device and includes an address notifying means for notifying means for notifying the external terminal device of a unique address of the terminal device requested by the external terminal device, and a unique ID generating means for generating a unique ID based on the unique address. Wireless communication connection is established with the external terminal device when the unique ID generated by the external terminal device based on the notified unique address and the unique ID generated by the unique ID generating means match each other. The unique address may be, for example, a MAC address of the terminal device.

Further, the terminal device may include a storage means for storing a predetermined authorization ID, and a distributing means for distributing the authorization ID. The address notifying means may notify the external terminal device of the unique address requested by the external terminal device which found the terminal device by the distributed authorization ID. The authorization ID may be, for example, a common authorization ID being provided to the terminal device and the external terminal device in advance.

The distributing means may distribute the unique ID, which was generated previously by the unique ID generating means, as the authorization ID during a predetermined period, and may distribute the authorization ID switched from the unique ID to the common authorization ID when there is no response to the unique ID during the predetermined period.

The terminal device may include, for example, a predetermined operation button, and the distributing means may distribute the authorization ID when the operation button is pressed.

EMBODIMENTS FOR CARRYING OUT THE INVENTION

Hereinafter, a back monitoring system according to embodiments of the present invention will be described with reference to the accompanying drawings.

Figure 1:
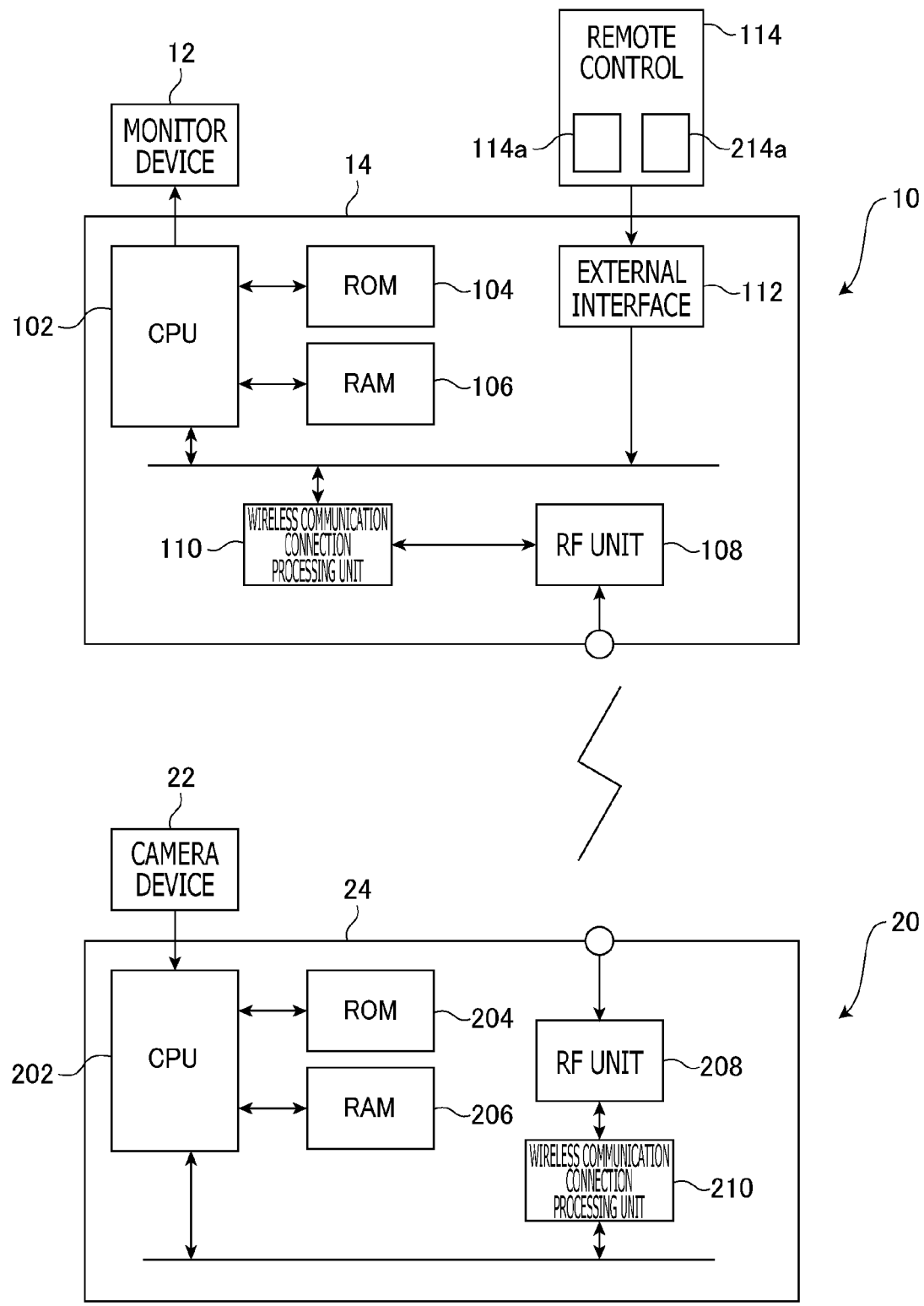
FIG. 1 A block diagram to illustrate a configuration of a back monitoring system according to an embodiment of the present invention.

FIG. 1 is a block diagram to illustrate a configuration of the back monitoring system according to the embodiment of the present invention. As shown in FIG. 1, the back monitoring system includes a monitor unit 10 and a camera unit 20. The monitor unit 10 includes a monitor device 12 and a receiver device 14 and is arranged, for example, on a dashboard. The camera unit 20 includes a camera device 22 and a transmitter device 24 and is arranged, for example, on a rear side of a trailer so that a rearview behind the trailer can be captured. In the present embodiment, the monitor device 12 is, for example, a known car navigation device, and the camera device 22 is, for example, a known digital camera, and neither of them is equipped with a wireless communication function. In the present embodiment, the wireless communication system to connect the monitor unit 10 and the camera unit 20 with each other for wireless communication is configured with the receiver device 14 and the transmitter device 24.

The monitor unit 10 (the monitor device 12 and the receiver device 14) may be configured as a single device, and more specifically, a device such as a car navigation device having a wireless communication function, a smartphone, a feature phone, or a portable gaming console may be anticipated. The camera unit 20 (the camera device 22 and the transmitter device 24) may also be configured as a single device, and a device such as a digital camera having a wireless communication function, a smartphone, a feature phone, or a portable gaming console may be anticipated.

The receiver device 14 includes a CPU (Central Processing Unit) 102, a ROM (Read Only Memory) 104, a RAM (Random Access Memory) 106, an RF (Radio Frequency) unit 108, a wireless communication connection processing unit 110, an external interface 112, and a remote control 114. The CPU 102 manipulates various programs and data stored in the ROM 104 and data temporarily stored in the RAM 106 and generally controls each component in the receiver device 14.

The transmitter device 24 includes a CPU 202, a ROM 204, a RAM 206, an RF unit 208, and a wireless communication connection processing unit 210. The CPU 202 manipulates various programs and data stored in the ROM 204 and data temporarily stored in the RAM 206 and generally controls each component in the transmitter device 24.

By the CPU 102 of the receiver device 14 and the CPU 202 of the transmitter device 24 operating in conjunction with each other, after wireless communication connection between the receiver device 14 and the transmitter device 24 is established and while a gear is placed in reverse, the rearview image (video) behind the trailer captured by the camera device 22 is transferred from the transmitter device 24 to the receiver device 14 and displayed on the screen of the monitor device 12. A driver of the tractor may observe the rearview image behind the trailer displayed on the screen of the monitor device 12 and, for example, drive the tractor in reverse to park. It is noted that, the receiver device 14 and the transmitter device 24 are connected with each other in a wireless communication method compliant with Wi-Fi (registered trademark) standard in the present embodiment; however, in another embodiment, the receiver device 14 and the transmitter device 24 may be connected with each other in a wireless communication method according to a different standard.

First Embodiment

Figure 2:
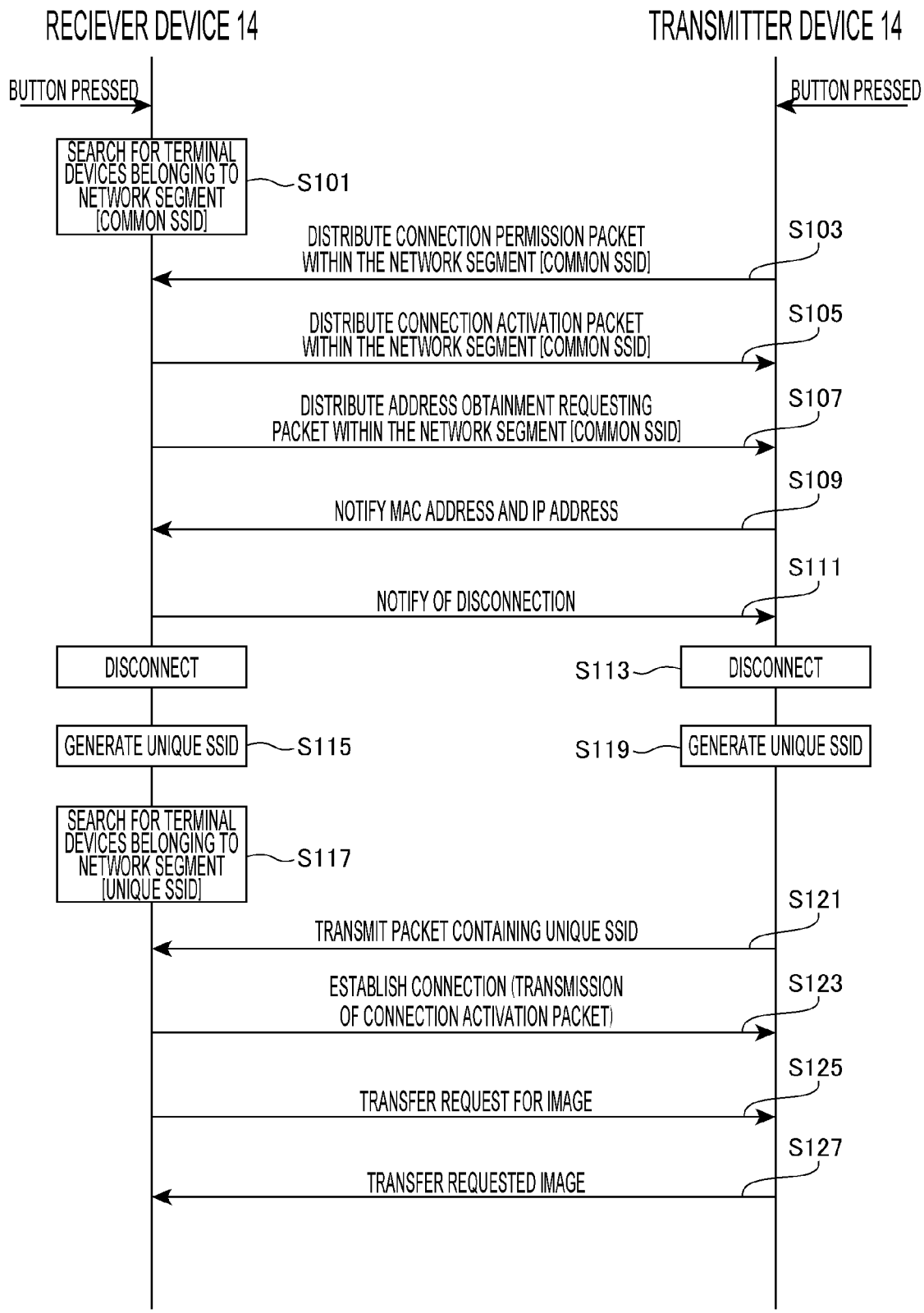
FIG. 2 A sequence diagram to illustrate wireless communication between a receiver device and a transmitter device according to a first embodiment of the present invention.

FIG. 2 is a sequence diagram to illustrate wireless communication between the receiver device 14 (CPU 102) and the transmitter device 24 (CPU 202) according to a first embodiment of the present invention. In the first embodiment of the present invention, a case with a tractor having the monitor unit 10 installed therein and a trailer having the camera unit 20 installed therein, while the tractor and the trailer are coupled to each other, is assumed. For the purpose of illustration, in the present description and the drawings, each of processing steps is abbreviated to "S."

(S101 In FIG. 2, Primary Search for Terminal Devices (Process on the Receiver Device 14))

The receiver device 14, upon a predetermined button operation, shifts to a predetermined primary search mode. In the primary search mode, terminal devices belonging to a network segment, which is defined by a common SSID (Service Set Identifier) for device authorization (pairing), are searched for. The common SSID for device authorization (hereinafter, represented as "common SSID") may be, for example, stored in the ROM 104 at the time when the product is shipped. Meanwhile, the predetermined button operation may be, for example, a user's pressing on a device authorization button 114a in the remote control 114. When the receiver device 14 detects the device authorization button 114a being pressed through the external interface 112, the receiver device 14 shifts to the primary search mode. On the other hand, if the search for the terminal devices experiences a timeout (when no terminal device is found within a predetermined period after the pressing of the device authorization button 114a), the receiver device 14 shifts to a sleep mode for power saving and stops emitting radio waves.

In the following description, for the purpose of illustration, a network segment defined by a such-and-such SSID will be represented as a "network segment (such-and-such SSID)."

(S103 in FIG. 2, Connection Permission (Process on the Transmitter Device 24))

In the ROM 202 of the transmitter device 24, the common SSID which is identical to the common SSID stored in the ROM 104 of the receiver 14 has been also stored since the shipping time of the product. The transmitter device 24, upon a predetermined button operation, incorporates the common SSID stored in the ROM 202 in a beacon packet (hereinafter, referred to as "the connection permission packet") and distributes it in order to permit the connection with the terminal device being in the primary search mode. In this regard, the predetermined button operation may be, for example, the user's pressing on a device authorization button (not shown) in the transmitter device 24. In the present embodiment, in consideration of the user's convenience, the device authorization button 214a for the transmitter device 24 is arranged in the remote control 114. For example, when the device authorization button 214a is pressed within a predetermined period after pressing of the device authorization button 114a, processes following S103 in the sequence diagram become executable. Meanwhile, during distribution of the connection permission packet, the transmitter device 24 is in a condition, in which the transmitter device 24 can permit connection with all the terminal devices being in the primary search mode. Therefore, distribution of the connection permission packet is stopped after elapse of a predetermined period in consideration of security.

(S105 in FIG. 2, Notification of Connection Activation (Process on the Receiver Device 14))

The connection permission packet is received and captured by the RF unit 108 of the receiver device 14 in the primary search mode and is demodulated by the wireless communication connection processing unit 110. The receiver device 14 judges whether or not the common SSID identical to the common SSID in the ROM 104 is contained in the demodulated data. While the receiver device 14, if the common SSID identical to the common SSID in the ROM 104 is contained in the demodulated data, succeeds in searching for the terminal device (the transmitter device 24) belonging to the network segment (common SSID), the receiver device 14 broadcasts a packet (hereinafter, referred to as "the connection activation packet"), which informs activation of connection, in the network segment (common SSID). If no common SSID identical to the common SSID in the ROM 104 is contained in the demodulated data, the receiver device 14 stays in the primary search mode until it shifts to the sleep mode.

(S107 in FIG. 2, Obtainment Request for Addresses (Process on the Receiver Device 14))

The receiver device 14 broadcasts a packet (hereinafter, referred to as "the address obtainment request packet") to request for a MAC address and an IP address of the transmitter device 24, which was found in the primary search mode, in the network segment (common SSID).

(S109 in FIG. 2, Notification of the Addresses (Process on the Transmitter Device 24))

The connection activation packet and the address obtainment request packet are received and captured by the RF unit 208 of the transmitter device 24, and is demodulated by the wireless communication connection processing unit 210. The transmitter device 24, in response to the address obtainment request packet, notifies the receiver device 14 of the MAC address and the IP address of the transmitter device 24 in response to the address obtainment request packet. The notification of the addresses may be, for example, executed in unicast designating the receiver device 14 based on the MAC address and the IP address of the receiver device 14 contained in the connection activation packet and the address obtainment request packet.

(S111 in FIG. 2, Notification of Disconnection (Process on the Receiver Device 14))

The receiver device 14, when notified of the MAC address and the IP address by the transmitter device 24, in order to establish more securely improved connection with the transmitter device 24, notifies the transmitter device 24 of disconnection of the connection and aborts the connection with the transmitter device 24.

(S113 in FIG. 2, Disconnection (Process on the Transmitter Device 24))

After receiving the disconnection notification from the receiver device 14, the transmitter device 24 aborts the connection with the receiver device 14.

(S115 in FIG. 2, Generating a Unique SSID (Process on the Receiver Device 14))

The receiver device 14 generates a unique SSID based on the MAC address (hereinafter represented as "the unique SSID") notified of by the transmitter device 24 according to a predetermined generating rule.

(S117 in FIG. 2, Secondary Search for Terminal Devices (Process on the Receiver Device 14))

After generating the unique SSID, the receiver device 14 shifts to a secondary search mode. The search for the terminal devices in the secondary search mode is conducted aiming at a range of a network segment (unique SSID), which is defined by the unique SSID generated in the process of S115 in FIG. 2.

(S119 in FIG. 2, Generating the Unique SSID (Process on the Transmitter Device 24))

The transmitter device 24 generates the unique SSID based on the MAC address of the transmitter device 24 according to the predetermined generating rule. The generating rule in the receiver device 14 and the generating rule in the transmitter device 24 are identical; therefore, the SSIDs generated based on the same MAC address are always identical. In other words, the unique SSID generated by the receiver device 14 in the process of S115 in FIG. 2 and the unique SSID generated by the transmitter device 24 in the process of S119 in FIG. 2 are identical.

(S121 in FIG. 2, Permission of Connection (Process on the Transmitter Device 24))

The transmitter device 24, in order to permit the connection with the receiver device 14, transmits the packet containing the unique SSID generated in the process of S119 in FIG. 2 to the receiver device 14.

(S123 in FIG. 2, Establishing the Connection (Process on the Receiver Device 14))

The receiver device 14 demodulates the packet transmitted from the transmitter device 24 and judges whether the demodulated data contains the unique SSID identical to the unique SSID generated in the process of S115 in FIG. 2. The receiver device 14, when the demodulated data contains the unique SSID identical to the unique SSID generated in the process of S115 in FIG. 2, transmits a packet to notify start of connection to the transmitter device 24. As the packet is received by the transmitter device 24, the wireless communication connection between the receiver device 14 and the transmitter device 24 is established, and data such as images becomes exchangeable within the secured network segment (unique SSID) defined by the unique SSID. While the unique SSID is generated based on the MAC address allocated antecedently to the transmitter device 24, the unique SSID is easily manageable. Therefore, the process to establish the connection can be managed more easily than the existing ad-hoc mode, in which the device authorization process is employed.

(S125 in FIG. 2, Transfer Request for Images (Process on the Receiver Device 14))

After the establishment of the wireless communication connection with the transmitter device 24, and while the gear in the tractor is placed in reverse, the receiver device 14 requests the transmitter device 24 to transfer the rearview images behind the trailer captured by the camera device 22.

(S127 in FIG. 2, Transferring the Images (Process on the Transmitter Device 24))

The transmitter device 24, according to the transfer request from the receiver device 14, transfers the rearview images behind the trailer captured by the camera device 22 to the receiver device 14.

The receiver device 14 outputs the rearview images behind the trailer transmitted from the transmitter device 24 through the monitor device 14. Thereby, the rearview images behind the trailer are displayed on the screen of the monitor device 12. The driver of the tractor may drive the tractor in reverse, for example, to park while observing the rearview images behind the trailer displayed on the screen of the monitor device 12.

Second Embodiment

Figure 3:
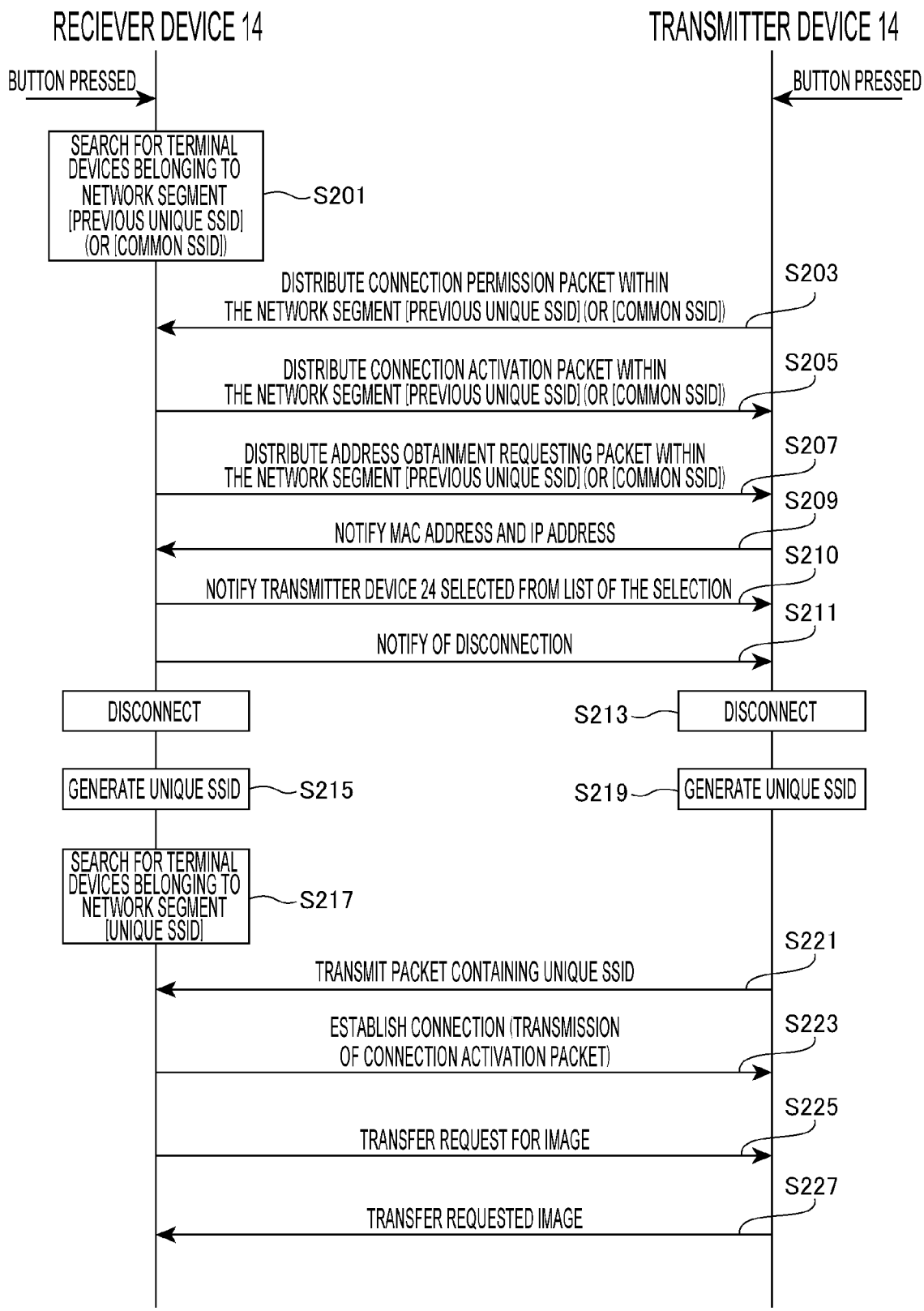
FIG. 3 A sequence diagram to illustrate wireless communication between a receiver device and a transmitter device according to a second embodiment of the present invention.

FIG. 3 is a sequence diagram to illustrate wireless communication between the receiver device 14 (CPU 102) and the transmitter device 24 (CPU 202) according to a second embodiment of the present invention. In the second embodiment of the present embodiment, a case with a tractor having the monitor unit 10 arranged therein and a plurality of trailers, each of which has the camera unit 20 arranged therein, while the tractor and the one of the plurality of trailers are coupled to each other, is assumed. In the second embodiment, items which are mentioned in the first embodiment will be only briefly described or may be omitted.

(S201 in FIG. 3, Primary Search for Terminal Devices (Process on the Receiver Device 14))

The receiver device 14, when the device authorization button 114*a* in the remote control 114 is pressed, shifts to a primary search mode. In the second embodiment, the receiver device 14 saves connection information (e.g., the unique SSID) concerning a terminal device, with which the receiver device 14 established connection previously, in the (non-volatile) RAM 106. The receiver device 14 searches for the terminal device belonging to the network segment (previous unique SSID), which is defined by the previous unique SSID stored in the RAM 106.

If the search for the terminal devices experiences a timeout (when no terminal device is found in the network segment (previous unique SSID) within a predetermined period after the pressing of the device authorization button 114a), the receiver device 14 switches the search range to the network segment (common SSID). In this regard, if no connection information is saved in the RAM 106, the receiver device 14 initially searches within the network segment (common SSID) immediately after the pressing of the device authorization button 114a.

(S203 in FIG. 3, Permission for Connection (Process on the Transmitter Device 24))

The transmitter device 24, during a time period from power-on of the transmitter device 24 until elapse of a predetermined time, incorporates the unique SSID (saved in the RAM 206) used in the previous wireless communication connection in a beacon packet (connection permission packet) and distributes it in order to permit the connection with the terminal devices being in the primary search mode.

If the transmitter device 24 reaches a timeout (when no connection activation packet is received within the time period from power-on until elapse of the predetermined time), the transmitter device 24 switches the SSIDs to be incorporated in the connection permission packet from the previous unique SSID to the common SSID. In this regard, if no connection information is saved in the RAM 206, the transmitter device 24 initially incorporates the common SSID in the beacon packet immediately after being powered on.

(S205 in FIG. 3, Notification of Connection Activation (Process on the Receiver Device 14))

If the search range is the network segment (previous unique SSID), and if the demodulated data of the connection permission packet contains the previous unique SSID, the receiver device 14 broadcasts (practically, unicasts) a connection activation packet in the network segment (previous unique SSID). If the search range is the network segment (common SSID), and if the demodulated data of the connection permission packet contains the common SSID, the receiver device 14 broadcasts the connection activation packet in the network segment (common SSID).

(S207 in FIG. 3, Obtainment Request for Addresses (Process on the Receiver Device 14))

The receiver device 14 broadcasts an address obtainment request within the network segment (previous unique SSID) or the network segment (common SSID).

(S209 in FIG. 3, Notification of Addresses (Process on the Transmitter Device 24))

The transmitter device 24, in response to the address obtainment request packet, notifies the receiver device 14 of the MAC address and the IP address of the transmitter device 24.

(S210 in FIG. 3, Selection of a Connecting Camera (Process on the Receiver Device 14))

If the range to be searched by the receiver device 14 is the network segment (common SSID), all the transmitter devices 24 in the network segment (common SSID) notify the receiver device 14 of the MAC addresses and the IP addresses thereof. In this regard, the MAC addresses (or the IP addresses) that the receiver device 14 is notified of are displayed in a list on the screen of the monitor device 12. The user may select an address of the camera unit 20 (the transmitter 24) being installed in the trailer coupled to the tractor, in which the monitor unit 10 is installed, by, for example, manipulating the remote control 114. The transmitter device 24 selected from the list is notified of the selection made by the user. In this regard, however, the list may not necessarily display the addresses of the transmitter devices 24 but may display, for example, nicknames respectively assigned to the addresses representing the transmitter devices 24 in consideration of the user's convenience.

(S211 in FIG. 3, Notification of Disconnection (Process on the Receiver Device 14))

The receiver device 14 notifies the transmitter device 24 in the network segment (previous unique SSID) or all the transmitter devices 24 in the network segment (common SSID) of disconnection and aborts the connection with the transmitter devices 24.

(Process in S213-S227 in FIG. 3)

In S213-S227 in FIG. 3, the processes practically similar to S113-S127 in FIG. 2 are executed. In this regard, the processes in S213-S227 in FIG. 3 are executed only between the receiver device 14 and the transmitter device 24 in the network segment (previous unique SSID) or the transmitter device 24 selected from the list.

According to the second embodiment, it is not necessary for the device authorization button on the transmitter device 24 to be pressed; therefore, compared to the first embodiment, operational burden on the user is reduced.

Above is provided the exemplary embodiments of the present invention. Embodiments of the present invention are not limited to those described above but may be provided in various modifications within the scope of technical idea of the present invention. For example, embodiments explicitly illustrated in the description and/or configurations combined with obvious embodiments may as well be regarded as the embodiments of the present invention.

For example, in a different embodiment, the processing steps on the receiver device 14 in the first and second embodiments may be performed by the terminal device (transmitter device) on the camera unit, and the processing steps on the transmitter device 24 in the first and second embodiments may be performed on the terminal device (receiver device) on the monitor unit. In other words, in the different embodiment, the wireless communication connection may be established within the secured network segment (unique SSID), which is defined by the unique SSID generated based on the MAC address of the receiver device.

Further, in the process of S210 (second embodiment) in FIG. 3, solely one transmitter device 24 is selectable; however, in a different embodiment, a plurality of transmitter devices 24 may be selectable. In this case, on the screen of the monitor device 12, rearview images of the camera devices 22 transmitted by the selected plurality of transmitter devices 24 may be circularly switched to be displayed.

What is claimed is:

1. A wireless communication system comprising a first terminal device and a second terminal device which are capable of communicating wirelessly, the first terminal device comprising:

a first processor; and a first memory storing instructions that cause the first processor to request the second terminal device for a unique address allocated to the second terminal device belonging to a predetermined network segment, the second terminal device comprising:

a second processor; and a second memory storing instructions that cause the second processor to notify the first terminal device of the unique address;

wherein the instructions stored in the first memory of the first terminal device further cause the first processor to generate a first unique ID based on the unique address notified of by the second terminal device, wherein the instructions stored in the second memory of the second terminal device further cause the second processor to generate a second unique ID based on the unique address, and wherein the first terminal device and the second terminal device establish mutual wireless communication connection when the first unique ID and the second unique ID match each other.

2. The wireless communication system according to claim 1,
wherein the unique address is a MAC address of the second terminal device.

3. The wireless communication system according to claim 1;
wherein the first terminal device comprises:
a first storage unit configured to store a first authorization ID; and
a search unit configured to search a terminal device having an authorization ID to match with the first authorization ID within a network segment defined based on the first authorization ID;
wherein the second terminal device comprises:
a second storage unit configured to store a second authorization ID; and
a distributing unit configured to distribute the second authorization ID; and
wherein, when search by the search unit succeeds by the distributed second authorization ID and the first authorization ID matching each other, the instructions in the first memory cause the first processor to request for the unique address within the network segment defined based on the first authorization ID.

4. The wireless communication system according to claim 3,
wherein the first and the second authorization IDs are a common authorization ID being stored in advance in the first and the second storage units.

5. The wireless communication system according to claim 4,
wherein the search unit:
executes the search during a first period with a first unique ID, which was generated previously as the first authorization ID; and
if no terminal device having an authorization ID matching with the first unique ID is found during the first period, executes the search after switching the first authorization ID from the first unique ID to the common authorization ID; and
wherein the distributing unit:
distributes the second unique ID, which was generated previously as the second authorization ID during a second period; and
distributes the second authorization ID switched from the second unique ID to the common authorization ID when there is no response to the second unique ID during the second period.

6. The wireless communication system according to claim 3,
wherein the first terminal device comprises a first operation button; and
wherein the search unit executes the search when the first operation button is pressed.

7. The wireless communication system according to claim 3,
wherein the second terminal device comprises a second operation button; and
wherein the distributing unit distributes the second authorization ID when the second operation button is pressed.

8. The wireless communication system according to claim 3,
wherein the first terminal device comprises a selecting unit configured to allow a user to select, when a plurality of terminal devices are found by the search unit, one of the plurality of terminal devices.

9. A terminal device capable of wirelessly communicating with an external terminal device, comprising:
a processor;
a first memory storing instructions that causes the processor to request an external terminal device belonging to a predetermined network segment for a unique address allocated to the external terminal device; and
to generate a unique ID based on the unique address of the external terminal device notified of in response to the request of the first memory instructions,
wherein a wireless communication connection is established with the external terminal device when the unique ID generated by the terminal device and the unique ID generated by the external terminal device based on the unique address match each other.

10. The terminal device according to claim 9, comprising:
a storage unit configured to store a predetermined authorization ID; and
a search unit configured to search an external terminal device having an authorization ID to match with the authorization ID within a network segment defined based on the authorization ID;
wherein, when the external terminal device is found by the search unit, the instructions cause the processor to request for the unique address within the network segment defined based on the authorization ID stored in the storing unit.

11. The terminal device according to claim 10,
wherein the authorization ID is a common authorization ID being provided to the terminal device and the external terminal device in advance.

12. The terminal device according to claim 11,
wherein the search unit is configured to:
execute the search during a predetermined period with a unique ID, which was generated previously as the authorization ID; and
if no external terminal device having an authorization ID matching with the unique ID is found during the predetermined period, execute the search after switching the authorization ID from the unique ID to the common authorization ID.

13. The terminal device according to claim 9, comprising:
a predetermined operation button,
wherein the search unit is configured to execute the search when the operation button is pressed.

14. The terminal device according to claim 9, comprising:
a selecting unit configured to allow a user to select, when a plurality of external terminal devices are found by the search unit, one of the plurality of external terminal devices.

15. The terminal device according to claim 9, wherein the unique address is a MAC address.

16. A terminal device capable of wirelessly communicating with an external terminal device, comprising:
a processor
said processor being configured to notify the external terminal device of a unique address of the terminal device requested by the external terminal device; and
being further configured to generate a unique ID based on the unique address, wherein a wireless communication connection is established with the external terminal device when the unique ID generated by the external terminal device based on the notified unique address and the unique ID generated by the terminal device match each other.

17. The terminal device according to claim 16, comprising:
   a storage unit configured to store a predetermined authorization ID; and
   a distributing unit configured to distribute the authorization ID;
   wherein the processor is configured to notify the external terminal device of the unique address requested by the external terminal device which found the terminal device by the distributed authorization ID.

18. The terminal device according to claim 17,
   wherein the authorization ID is a common authorization ID being provided to the terminal device and the external terminal device in advance.

19. The terminal device according to claim 18,
   wherein the distributing unit:
      is configured to distribute the unique ID, which was generated previously by the unique ID generating unit, as the authorization ID during a predetermined period; and
      to distribute the authorization ID switched from the unique ID to the common authorization ID when there is no response to the unique ID during the predetermined period.

20. The terminal device according to claim 17, comprising:
   a predetermined operation button,
   wherein the distributing unit distributes the authorization ID when the operation button is pressed.

21. The terminal device according to claim 15, wherein the unique address is a MAC address.

* * * * *